(12) United States Patent
Kregel

(10) Patent No.: US 6,799,017 B1
(45) Date of Patent: Sep. 28, 2004

(54) MISSED CALL NOTIFICATION TO CELLULAR TELEPHONE USING SHORT TEXT MESSAGING

(75) Inventor: Alan L. Kregel, Lawrenceville, GA (US)

(73) Assignee: BellSouth Intellectual Property, Wilmington, DE (US)

( * ) Notice: Subject to any disclaimer, the term of this patent is extended or adjusted under 35 U.S.C. 154(b) by 498 days.

(21) Appl. No.: 09/839,217

(22) Filed: Apr. 23, 2001

Related U.S. Application Data

(63) Continuation-in-part of application No. 09/822,332, filed on Apr. 2, 2001.

(51) Int. Cl.[7] .................................................. H04B 7/00
(52) U.S. Cl. .................. 455/70; 455/435.1; 379/205.01
(58) Field of Search ................................ 455/458, 414, 455/426, 512, 422, 70, 435.1; 709/206; 379/205.01

(56) References Cited

U.S. PATENT DOCUMENTS

| | | | | |
|---|---|---|---|---|
| 5,559,876 A | * | 9/1996 | Alperovich | 379/205.01 |
| 5,649,305 A | * | 7/1997 | Yoshida | 455/70 |
| 6,173,182 B1 | * | 1/2001 | Cha | 455/435.1 |

OTHER PUBLICATIONS

Bell Atlantic Mobile, "Mobile Messenger" Jan. 1994.*

* cited by examiner

*Primary Examiner*—William Cumming
(74) *Attorney, Agent, or Firm*—Cantor Colburn LLP

(57) ABSTRACT

A system for and method of providing Short Message Service (SMS) message notification to a cellular telephone customer regarding missed incoming calls that are missed while the cellular telephone is unavailable such as when the telephone is powered off. This is accomplished by generating a notification message at a SS7 gateway that includes caller ID/name ID information and/or time of the missed call. The message is preferably generated at the SS7 gateway only upon receipt of an "access denied" response with a reason code of at least one of MS Inactive, Busy, No Page Response or Unavailable that is sent from a home location register in response to a location request sent by the SS7 gateway. Once the generated message is complete it is sent to a message center where it is stored until it is retrieved by the cellular telephone soon after registration with the cellular network.

39 Claims, 4 Drawing Sheets

# MISSED CALL NOTIFICATION TO CELLULAR TELEPHONE USING SHORT TEXT MESSAGING

This application is a continuation-in-part application of U.S. Ser. No. 09/822,332, filed Apr. 2, 2001, which is incorporated herein in its entirety.

BACKGROUND

1. Field of the Invention

The present invention is directed to cellular telephone system call features and management. More particularly, the present invention is directed to a system for and method of notifying a cellular telephone customer of a missed call using a short text message.

2. Background of the Invention

Cellular telephone usage has been growing at an exceptional pace. People use cellular telephones for a variety of reasons including safety, increased availability while away from a conventional wireline/landline telephone and/or because cellular telephone services provided by cellular telephone providers can offer greater value compared to conventional wireline service. In all cases, however, cellular telephone customers typically seek a reliable alternative to conventional wireline means of communication wither because they are away from the wireline means of communication, or because access to those means of communication is inconvenient.

To enhance a cellular telephone customer's sense of staying in touch, cellular telephone service providers offer voice mail service as one of many service offerings. This well-known service causes an incoming call to a cellular telephone, which is not available to receive the incoming call, to be forwarded to a voice mail service where the caller can leave a message for the cellular telephone customer. Typically, an incoming call will be forwarded to voice mail when the cellular telephone is powered off (i.e., not registered), when the cellular telephone is being used (and no call waiting feature is available), or when the cellular telephone customer configures his cellular telephone to forward incoming calls to voice mail even though the cellular telephone is powered on and available to receive calls.

Since voice mail is often an add-on feature that is not typically included in basic service plans offered by cellular telephone service providers, customers who desire voice mail must pay extra for this service. However, not all customers are willing to pay the full fee for voice mail service. On the other hand, some of these same customers might still desire a service that provides information regarding incoming calls that might have been missed.

SUMMARY OF THE INVENTION

The present invention addresses and overcomes the drawbacks of having to offer only conventional cellular telephone voice mail service to cellular telephone customers by providing Short Message Service (SMS) message notification to a cellular telephone customer about incoming calls that are missed. That is, the present invention provides a means for notifying a cellular telephone customer of missed calls (e.g., because the cellular telephone is not registered) without requiring the cellular telephone customer to purchase a relatively expensive voice mail add-on feature or option as part of their cellular telephone service plan. The present invention is operable with both landline and cellular telephone-originated calls.

In the landline-originated implementation the present invention is preferably implemented in a telecommunications infrastructure including a landline telephone that is connected to a central office (CO), which itself is connected to an SS7 gateway. The SS7 gateway is able to communicate with both a SMS message center and a home location register (HLR), which is often incorporated with a mobile switching center (MSC). The MSC, in turn, is in communication with cellular telephones. In accordance with the present invention, in addition to employing the SS7 gateway to perform well-known call setup functions, the SS7 gateway is programmed or is modified to include a "message generator," which becomes operable when the HLR returns, in response to a location request query from the SS7 gateway, an "access denied" response with a reason code of "MS Inactive", "Busy", "No Page" or "Unavailable."

The message generator preferably generates a message containing the landline caller ID/calling name ID and any other text message that will fit within the remaining portion of the maximum allowable characters in a SMS message. The information for creating the SMS message is available at the SS7 gateway since the CO-typically provides that information to the gateway when the landline call is originally placed. The generated SMS message preferably also includes the time that the missed call was attempted.

Once the message is complete it is sent to the message center (MC) where it is stored in memory until the called cellular telephone is powered on, registers, or otherwise makes itself available to the cellular network. At that time, the MC delivers the short message that was generated, originally, at the SS7 gateway, thereby providing missed call notification to the cellular telephone customer.

Thus, the present invention provides numerous advantages, not the least of which is that a cellular telephone customer can receive a missed call notification service that, while not as extensive as voice mail service, nevertheless provides useful and timely information to the customer about missed calls. Further, the cost to implement the service of the present invention is relatively low since it is not necessary to purchase and field expensive voice mail systems to retain messages. Accordingly, customers will be more willing to purchase the less expensive service.

When the call originates from another cellular telephone, the call is passed to a servicing mobile switching center (MSC) and associated SS7 gateway in which the message generator of the present invention may be implemented.

It is therefore an object of the present invention to provide methods and systems for providing missed call notification to cellular telephones from landline or cellular telephones.

It is another object of the present invention to provide a missed call notification using a short message service message.

It is another object of the present invention to provide notification of a missed call due to a cellular telephone that is powered off or is otherwise unavailable to the network.

It is also an object of the present invention to provide a message generator that is co-located or integral with a SS7 gateway.

It is another object of the present invention to generate short message service messages at a SS7 gateway and pass those messages to a message center where the messages await distribution to wireless device customers, including cellular telephone customers.

It is yet another object of the present invention to block or filter predetermined missed call notifications using a message generator at a SS7 gateway.

These and other objects of the present invention will become apparent upon a reading of the following detailed description in conjunction with the accompanying drawings.

DETAILED DESCRIPTION OF THE INVENTION

The present invention provides notification to a cellular telephone customer (or other wireless device customer) about missed incoming calls resulting from the customer's cellular telephone being powered off, being busy, or being otherwise unavailable to the network. That is, the present invention provides a means for notifying a cellular telephone customer of missed calls without requiring the cellular telephone customer to purchase a relatively expensive voice mail add-on feature or option for their cellular telephone service plan.

Figure 1:
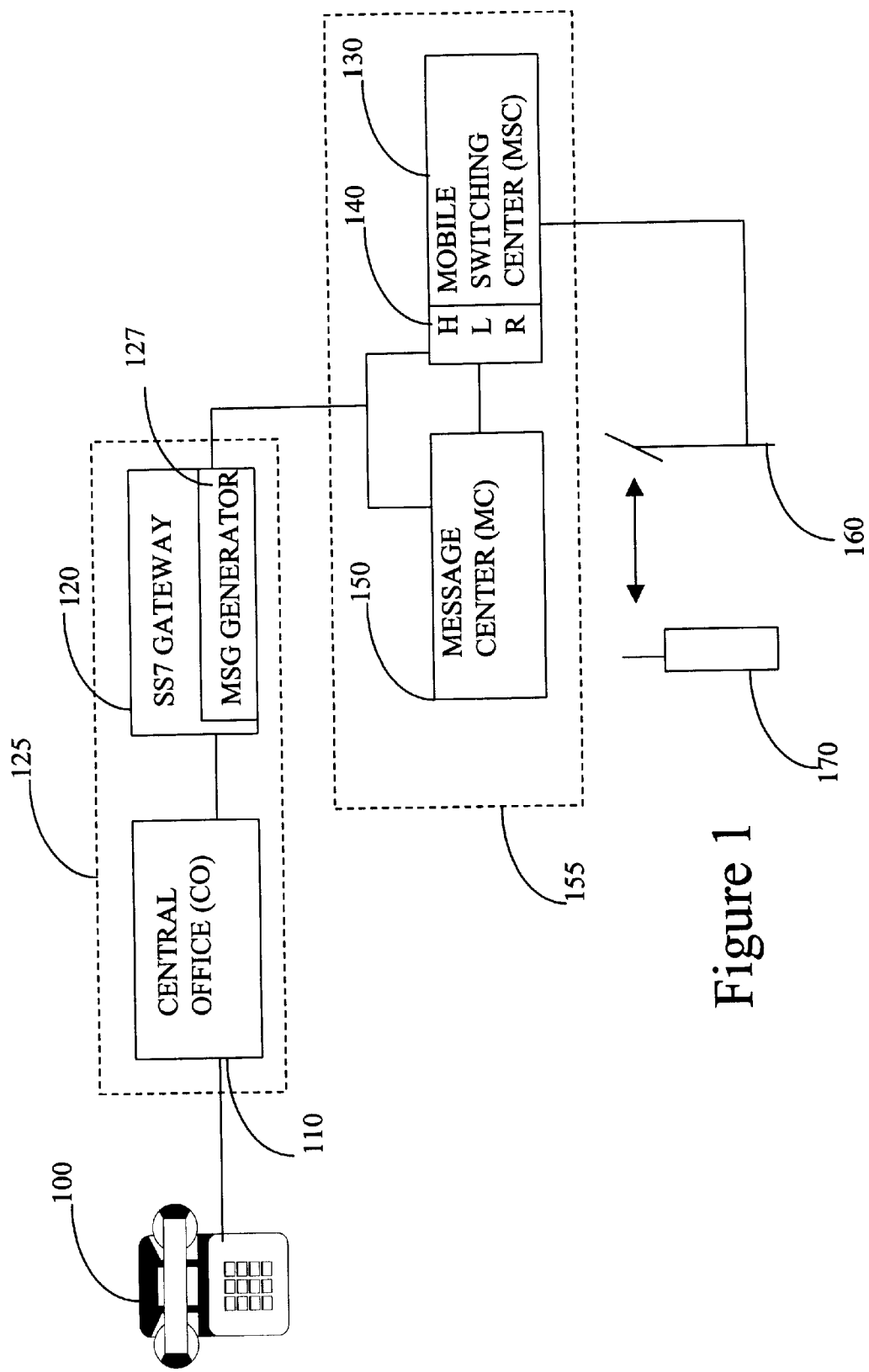
FIG. 1 is a schematic diagram of an exemplary telecommunications architecture in which the present invention can be implemented.

FIG. 1 is a schematic diagram of an exemplary telecommunications architecture in which the present invention can be implemented. Landline telephone 100 is connected to central office (CO) 110. CO 110 is connected to an SS7 gateway 120, which is used in its conventional way to set up calls between central office 100 and other nodes, such as another central office (not shown) or a mobile switching center 130. Of course, CO 100 and SS7 gateway 120 can be co-located as shown by dotted enclosure 125. Also shown in connection with SS7 gateway is Message Generator 127, which will be explained in more detail below. SS7 gateway 120 is preferably in communication with mobile switching center (MSC) 130, which typically includes or has access to a home location register (HLR) 140. SS7 gateway 120 is also preferably in communication with a short message service (SMS) message center (MC) 150.

SMS is a means by which short messages can be sent over the air from a base station, such as MC 150, to wireless digital devices including digitally-enabled cellular telephones. Alphanumeric messages up to 160 characters can be supported according to well-known protocols. As with the CO and SS7 gateway, MSC 130, HLR 140 and MC 150 can also be co-located as shown by dotted enclosure 155.

Finally, as is conventional, MSC 130 is connected to or is in communication with a base station or antenna 160, which communicates with cellular telephone 170, sometimes referred to herein as a mobile telephone.

In accordance with the present invention, a cellular telephone customer can receive a notification of a call that was missed because, for example, his cellular telephone was powered off. This is achieved by generating and sending a SMS text message comprising the name and number of the caller who was trying to reach the cellular telephone. A more detailed explanation of the various aspects and embodiments of the present invention is set forth below.

Figure 2:
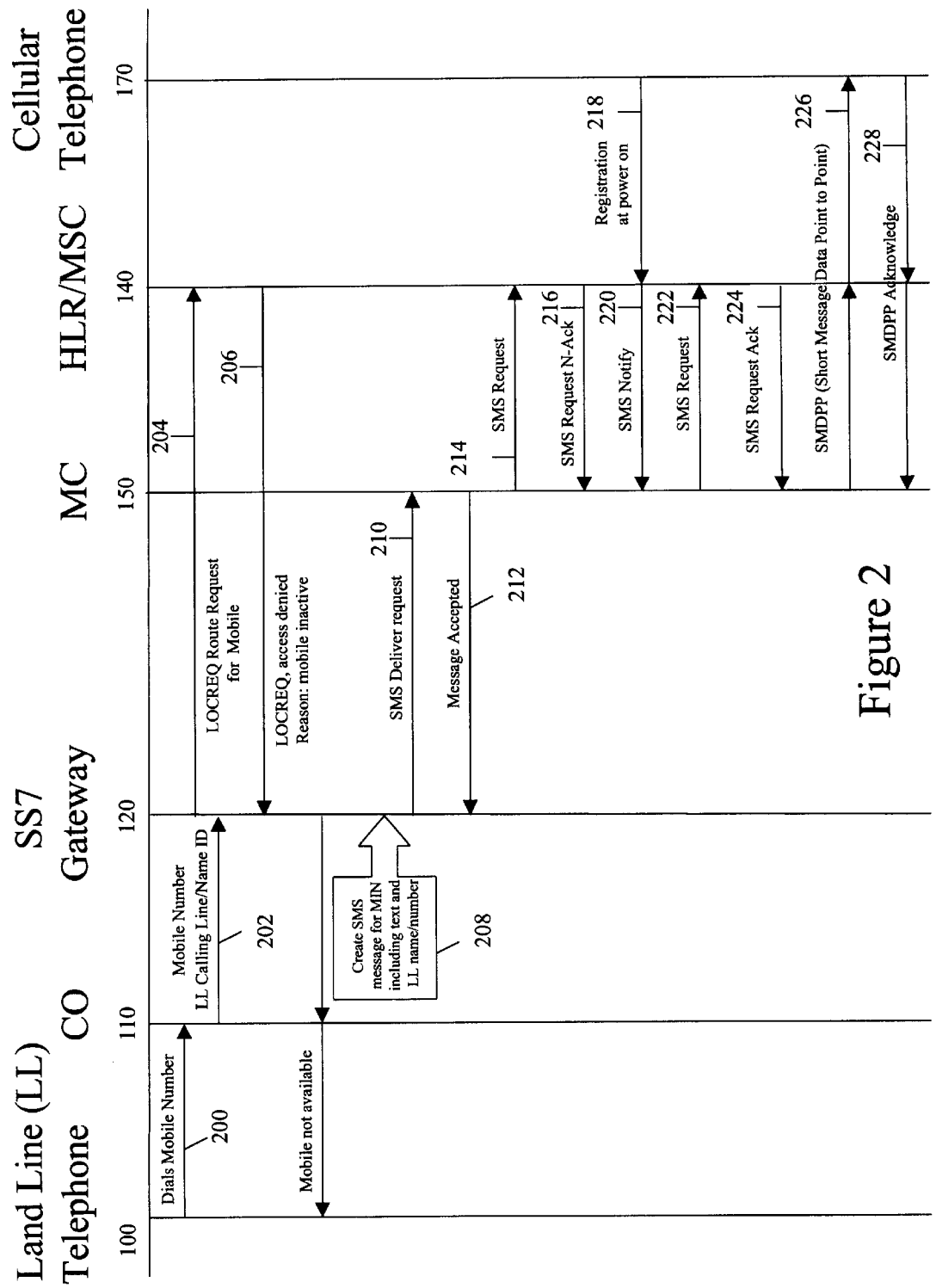
FIG. 2 is an exemplary chart illustrating events that typically occur between and among the components shown in FIG. 1 when a landline telephone attempts to call a mobile telephone, in accordance with the present invention.

FIG. 2 is an exemplary chart illustrating events or steps that typically occur between and/or among the components shown in FIG. 1 in accordance with the present invention. In the following example, a telephone call is placed from a landline telephone to a mobile telephone. Referring to FIG. 2, a call originates from the landline telephone 100 and connects to CO 110 (event 200). CO 100 recognizes the dialed digits sent from telephone 100 as they are entered on the keypad and then sends the cellular telephone number (i.e., the dialed digits) and the landline/calling line ID or calling name ID to SS7 Gateway 120 (event 202). As mentioned previously, SS7 is a signaling system that is used for setting up calls between offices, nodes, and other components of the telephone network. Because the dialed number is recognized at the SS7 gateway as a cellular telephone number, SS7 gateway 120 sends a locate request (LOCREQ) to home location register (HLR) 140 using well-known operating software within the gateway (event 204).

As is well known in the art, the home location register (HLR) is a database that contains cellular telephone customer or subscriber profiles. If the cellular telephone to which the call is directed is, for example, not powered on at the time the HLR receives the location request, then the HLR returns an "access denied" message with a reason code of "MS Inactive", "Busy", "No Page Response" or "inavailable" (event 206). If the cellular telephone customer does not have voice mail, then SS7 gateway 120 forwards the inactive notification to central office 110 and then ultimately back to the landline caller. A message is typically played for the landline caller that indicates that the mobile or cellular telephone is not available. In prior art systems, the sequence of events typically ends here, assuming the cellular telephone customer does not subscribe to voice mail.

In accordance with the present invention, however, when an access denied message with a reason code of "MS Inactive", "Busy", "No Page Response" or "Unavailable" is received at SS7 gateway 120, SS7 gateway 120 not only causes a message to be played for the landline caller indicating the called cellular telephone is not available, but the SS7 gateway also creates, via Message Generator 127, a SMS message containing the landline caller ID/calling name ID (event 208) and any other text message that will fit within the remaining portion of maximum allowable characters in the SMS. Message Generator 127 preferably comprises one or more software routines and or hardware components that can be programmed to provide the functionality described herein. The information for creating the SMS message is available at the SS7 gateway since CO 110 provided that information to the gateway when the landline call was originally placed. That is, SS7 gateway 120 and/or Message Generator 127 preferably buffers the calling number, and also the mobile telephone number that was called so that this information remains available for creating the SMS message in the event such a message is desired. The SMS message preferably includes the telephone number (and preferably also name) of the calling party. The time of the call may also be included.

Once the message is complete it is sent to MC 150 via the well-known IS41 standard SMS Deliver request (event 210). Message centers capable of receiving SMS messages are well-known in the art. MC 150 accepts the message (event 212) and sends a SMS request (event 214) to HLR 140. Because the cellular telephone to which the SMS message is directed is not powered on, HLR 140 returns a SMS Request N-ack response (event 216) and simultaneously sets a flag within HLR 140 that a message is waiting in MC 150 (not shown).

Later, when cellular telephone 170 is powered on, it registers with the cellular system (event 218), namely, HLR 140. HLR 140, having previously set a message waiting flag for the cellular telephone customer, sends a SMS notify message to MC 150 (event 220). MC 150 then sends another SMS Request (event 222), which is answered by HLR 140 with a SMS Request Ack (event 224). Thus, the short message that was generated, originally, at the SS7 gateway is passed to and acknowledged by cellular telephone 170 via the well-known Short Message Data Point to Point (SMDPP) and SMDPP Acknowledge exchange (events 226 and 228).

Advantages of the foregoing system are evident. For example, it is relatively simple to generate the short message at the SS7 gateway since all the information is being buffered there in any event. Moreover, the triggering event for generating the short message, namely, a "LOCREQ, access denied" communication, is received by the SS7 gateway and thus is readily available to Message Generator 127. Further still, a cellular telephone customer can receive a level of service that, while not as extensive as voice mail, nevertheless provides useful and timely information to the customer-about missed-calls. Further still, the cost to implement the service of the present invention is relatively low since it is not necessary to purchase and field expensive voice mail systems to retain messages.

Figure 3:
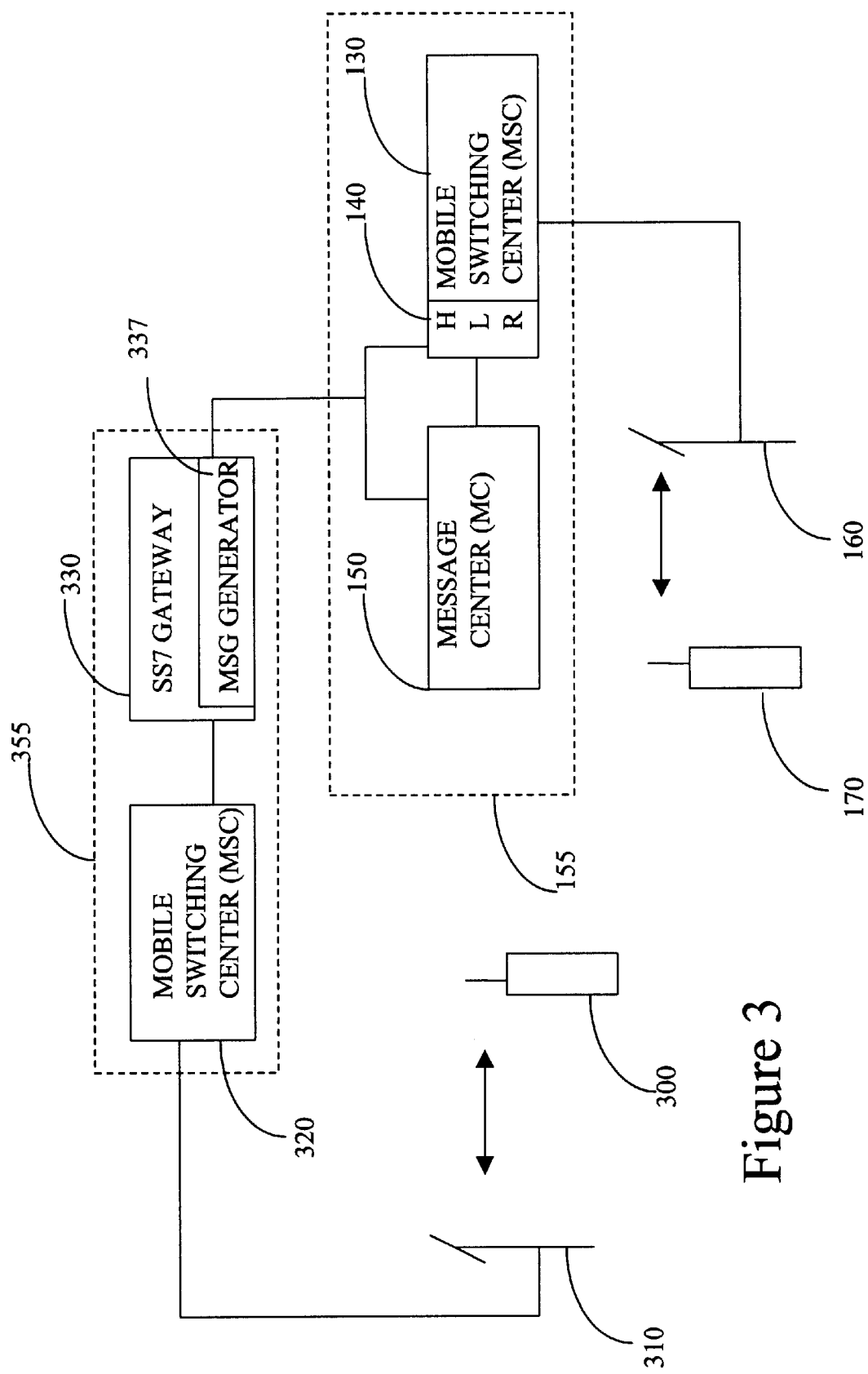
FIG. 3 is a schematic diagram of another exemplary telecommunications architecture in which the present invention may be implemented.

FIG. 3 is another exemplary telecommunications architecture in which the present invention may be implemented. FIG. 3 shows the case where a cellular telephone 300, rather than a landline telephone, is attempting to contact another cellular telephone 170. Thus, FIG. 3 shows a cellular telephone 300, a base station or antenna 310, a MSC 320, a SS7 gateway 330, with the latter two components capable of being co-located as shown by dotted enclosure 335. SS7 gateway 330 preferably also includes Message Generator 337, which is functionally similar to Message Generator 127.

Figure 4:
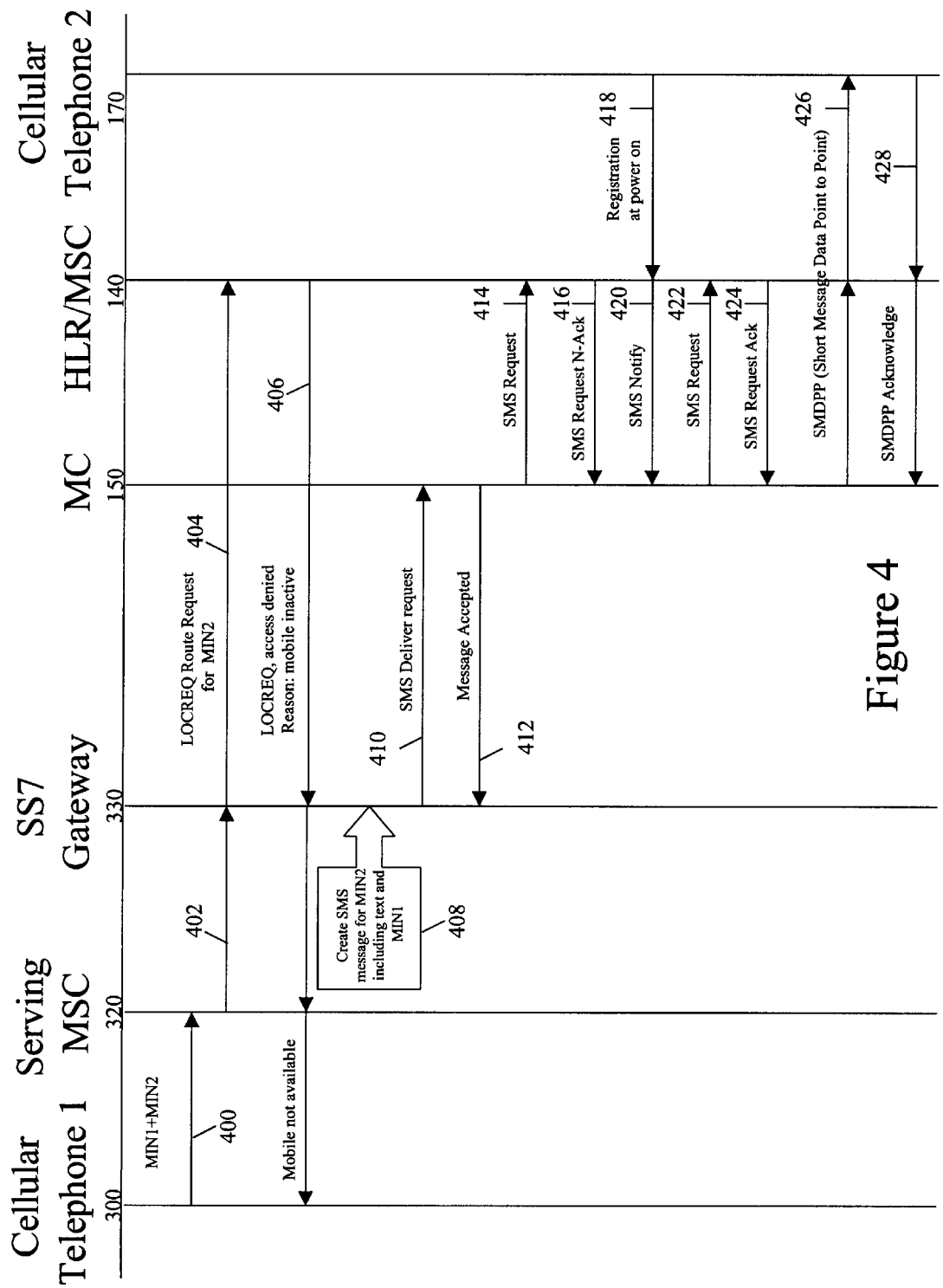
FIG. 4 is an exemplary chart illustrating events or steps that typically occur between and/or among the components shown in FIG. 3 when a mobile telephone attempts to call another mobile telephone, in accordance with the present invention.

FIG. 4 is a chart illustrating the events or steps that occur between and/or among the components shown in FIG. 3 when a mobile telephone attempts to call-another mobile telephone that is powered off. As shown, a call originates from cellular telephone 300 and is passed to MSC 320 (event 400). In this case, both of the mobile telephone numbers or mobile identification numbers (MINs) are passed to MSC 320. MSC 320 then passes that information to SS7 Gateway 330 (event 402). The dialed number is recognized at the SS7 gateway as a cellular telephone number and, as such, SS7 gateway 330 sends a locate request (LOCREQ) to home location register (HLR) 140 using well-known operating software within the gateway (event 404).

If the called cellular telephone, i.e., cellular telephone 170, is not powered on at the-time the HLR receives the location request, then the HLR returns an "access denied" message with a reason code of "MS Inactive", "Busy", "No Page Response" or "Unavailable" (event 406), which triggers a message to be played on cellular telephone 300 indicating that the called mobile or cellular telephone is not available. In prior art systems, the sequence of events typically ends here, assuming the cellular telephone customer does not subscribe to voice mail.

In accordance with the present invention, however, when an access denied message with a reason code of "MS Inactive", "Busy", "No Page Response" or "Unavailable" is received at SS7 gateway 330, SS7 gateway 330 not only causes a message to be played for the calling cellular telephone indicating the called cellular telephone is not available, but the SS7 gateway also creates a SMS message containing the calling cellular telephone's MIN and/or name ID (event 408) and any other text message that will fit within the remaining portion of maximum allowable characters in the SMS. The information for creating the SMS message is available at the SS7 gateway since MSC 320 provided that information to the gateway when the cellular telephone 300 call was originally placed. That is, SS7 gateway 330 preferably buffers the calling number and called MINs (MIN1 and MIN2), so that this information remains available for creating the SMS message in the event it is desired. The time of the call may also be included as can be a small message such as, "a call from xxxxx was missed at date, hh:mm".

Once the message is complete it is sent to MC 150 via the well-known IS41 standard SMS Deliver request (event 410). MC 150 accepts the message (event 412) and sends a SMS request (event 414) to HLR 140. Because the cellular telephone to which the SMS message is directed is not powered on, HLR 140 returns a SMS Request N-ack response (event 416) and simultaneously sets a flag within HLR 140 that a message is waiting in MC 150.

When cellular telephone 170 is powered on and/or it registers with the cellular system (event 418), HLR 140, having previously set a message waiting flag for the cellular telephone customer, sends a SMS notify message to MC 150 (event 420). MC 150 then sends another SMS Request (event 422), which is answered by HLR 140 with a SMS Request Ack (event 424). Thus, the short message that was generated, originally, at Message Generator 337 is passed to and acknowledged by cellular telephone 170 via the SMDPP and SMDPP Acknowledge exchanges (events 426 and 428).

Thus, whenever an SS7 gateway is involved in setting up a call to a cellular telephone that is SMS-enabled and that cellular telephone is powered off at the time of the attempted call setup, a Message Generator, which can be integral with the SS7 gateway, preferably generates a short message in accordance with the SMS standard (or any other similar standard or protocol that is receivable by the cellular telephone or other mobile device) and that message is sent to a message center. The message is then automatically retrieved and displayed by the called cellular telephone when that cellular telephone is powered on and registers.

The present invention should not necessarily be construed to be limited to automatically generating messages for all missed calls. Rather, the described notification feature or service is preferably enabled only for those customers who request the feature as part of their cellular telephone service plan.

Also, Message Generator 127 or 337 is also preferably programmable to filter calls. For example, a cellular telephone customer who primarily uses his telephone for business and regularly calls his office while on the road does not need to know that his office called while his mobile telephone was powered off since he will likely be calling his office anyway. On the other hand, that customer would want to know about other calls that may have been missed. Accordingly, Message Generator 127 or 337 preferably includes a calling party filtering table or list that is used to disable the notification feature for predetermined telephone numbers.

The present invention also provides a competitive advantage to cellular telephone service providers that also operate conventional landline telephone systems. Specifically, landline telephone service providers will typically control and manage central offices and associated SS7 gateways throughout the telephone network, whereas cellular telephone service providers do not control or manage central offices. Thus, only landline telephone service providers are able to control whether a SS7 gateway can be configured in accordance with the principles of the present invention. That is, unless central offices and associated SS7 gateways include the functionality described herein, a cellular telephone customer cannot receive a missed call notification from a landline-placed call. In view of the foregoing, service providers that offer both cellular and conventional landline services can offer cellular telephone customers enhanced service (namely, missed call notification for landline as well as mobile originated calls) that cellular service-only providers cannot offer.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of providing missed call notification to a cellular telephone, comprising the steps of:
   (a) receiving a telephone call, which is directed to a cellular telephone, at a central office;
   (b) forwarding call setup information that is representative of the telephone call from the central office to a SS7 gateway and sending a location request communication to a home location register;
   (c) receiving an access denied response with a reason code of at least one of MS Inactive, Busy, No Page Response and Unavailable from the home location register;
   (d) generating, in response to step (c), a message at the SS7 gateway including information identifying the origin of the telephone call;
   (e) sending the message to a message center; and
   (f) forwarding the message to the cellular telephone when the cellular telephone registers with the home location register, thereby providing notification of a missed call.

2. The method of claim 1, further comprising generating the message only when the cellular telephone is not registered with the home location register.

3. The method of claim 1, further comprising generating the message only when the cellular telephone is powered off.

4. The method of claim 1, wherein the message comprises at least one of a telephone number from which the telephone call originated, a name and a time of the telephone call.

5. The method of claim 1, further comprising filtering telephone calls for which notification is provided.

6. The method of claim 1, wherein the home location register is associated with a mobile switching center.

7. The method of claim 1, wherein the same business entity operates both the central office and a cellular telephone network.

8. The method of claim 1, wherein an incremental cost to a customer for receiving missed call notification in accordance with steps (a)–(f) is less than an incremental cost to the customer for voice mail service.

9. The method of claim 1, wherein the message generator is implemented in one of hardware, software or a combination thereof.

10. The method of claim 1, wherein the message is a short message service (SMS) message.

11. A method of providing missed call notification, comprising the steps of:
    (a) receiving a telephone call from a first cellular telephone, which is directed to a second cellular telephone, at a mobile switching center;
    (b) forwarding call setup information that is representative of the first cellular telephone call from the mobile switching center to a SS7 gateway and sending a location request communication to a home location register;
    (c) receiving an access denied response with a reason code of at least one of MS Inactive, Busy, No Page Response and Unavailable from the home location register;
    (d) generating, in response to step (c), a message at the SS7 gateway including information identifying the origin of the telephone call;
    (e) sending the message to a message center; and
    (f) forwarding the message to the second cellular telephone when the second cellular telephone registers with the home location register, thereby providing notification of a missed call.

12. The method of claim 11, further comprising generating the message only when the second cellular telephone is not registered with the home location register.

13. The method of claim 11, further comprising generating the message only when the second cellular telephone is powered off.

14. The method of claim 11, wherein the message comprises at least one of a telephone number from which the telephone call originated, a name and a time of the telephone call.

15. The method of claim 11, further comprising filtering telephone calls for which notification is provided.

16. The method of claim 11, wherein the home location register is associated with a mobile switching center.

17. The method of claim 11, wherein an incremental cost to a customer for receiving missed call notification in accordance with steps (a)–(f) is less than an incremental cost to the customer for voice mail service.

18. The method of claim 11, wherein the message generator is implemented in one of hardware, software or a combination thereof.

19. The method of claim 11, wherein the message is a short message service (SMS) message.

20. A system for providing missed call notification to a cellular telephone, comprising:
    (a) a central office operable to receive a telephone call, which is directed to a cellular telephone;
    (b) a SS7 gateway in communication with a central office operable to receive call setup information that is representative of the telephone call and send a location request communication to a home location register based on the call set up information;

(c) means for receiving an access denied response with a reason code of at least one of MS Inactive, Busy, No Page Response and Unavailable from the home location register;

(d) a message generator operable to generate, in response to the home location register, a message at the SS7 gateway including information identifying the origin of the telephone call;

(e) means for sending the message to a message center; and (f) means for forwarding the message to the cellular telephone when the cellular telephone registers with the home location register, thereby providing notification of a missed call.

21. The system of claim 20, wherein the message is generated only when the cellular telephone is not registered with the home location register.

22. The system of claim 20, wherein the message is generated only when the cellular telephone is powered off.

23. The system of claim 20, wherein the message comprises at least one of a telephone number from which the telephone call originated, a name and a time of the telephone call.

24. The system of claim 20, further comprising means for filtering telephone calls for which notification is provided.

25. The system of claim 20, wherein the home location register is associated with a mobile switching center.

26. The system of claim 20, wherein the same business entity operates both the central office and a cellular telephone network.

27. The system of claim 20, wherein an incremental cost to a customer for receiving missed call notification via the system of claim 20 is less than an incremental cost to the customer for voice mail service.

28. The system of claim 20, wherein the message generator is implemented in one of hardware software or a combination thereof.

29. The system of claim 20, wherein the message is a short message service (SMS) message.

30. A system for providing missed call notification, comprising:

(a) a mobile switching center operable to receive a telephone call from a first cellular telephone, which is directed to a second cellular telephone;

(b) means for forwarding call setup information that is representative of the first cellular telephone call from the mobile switching center to a SS7 gateway and sending a location request communication to a home location register;

(c) means for receiving an access denied response with a reason code of at least one of MS Inactive, Busy, No Page Response and Unavailable from the home location register;

(d) a message generator operable to generate, in response to receipt of the access denied response, a message at the SS7 gateway including information identifying the origin of the telephone call;

(e) means for sending the message to a message center; and (f) means for forwarding the message to the second cellular telephone when the second cellular telephone registers with the home location register, thereby providing notification of a missed call.

31. The system of claim 30, wherein the message is generated only when the cellular telephone is not registered with the home location register.

32. The system of claim 30, wherein the message is generated only when the cellular telephone is powered off.

33. The system of claim 30, wherein the message comprises at least one of a telephone number from which the telephone call originated, a name and a time of the telephone call.

34. The system of claim 30, further comprising means for filtering telephone calls for which notification is provided.

35. The system of claim 30, wherein the home location register is associated with a mobile switching center.

36. The system of claim 30, wherein the same business entity operates both the central office and a cellular telephone network.

37. The system of claim 30, wherein an incremental cost to a customer for receiving missed call notification via the system of claim 20 is less than an incremental cost to the customer for voice mail service.

38. The system of claim 30, wherein the message generator is implemented in one of hardware, software or a combination thereof.

39. The system of claim 30, wherein the message is a short message service (SMS) message.

* * * * *